United States Patent
Peng et al.

(10) Patent No.: US 10,895,597 B2
(45) Date of Patent: Jan. 19, 2021

(54) SECURE COPROCESSOR ASSISTED HARDWARE DEBUGGING

(71) Applicant: Advanced Micro Devices, Inc., Santa Clara, CA (US)

(72) Inventors: Tan Peng, San Jose, CA (US); Dong Zhu, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 11 days.

(21) Appl. No.: 16/197,655

(22) Filed: Nov. 21, 2018

(65) Prior Publication Data

US 2020/0158778 A1 May 21, 2020

(51) Int. Cl.
*G01R 31/20* (2006.01)
*G01R 31/317* (2006.01)
(Continued)

(52) U.S. Cl.
CPC ... *G01R 31/31705* (2013.01); *G01R 31/3177* (2013.01); *G01R 31/31719* (2013.01);
(Continued)

(58) Field of Classification Search
CPC .. G06F 11/267; G06F 11/261; G06F 11/3648; G06F 11/3656; G06F 21/31; G06F 21/86; G06F 11/2294; G06F 11/25; G06F 11/364; G06F 21/575; G06F 11/0712; G06F 11/0742; G06F 11/0745; G06F 11/0778; G06F 9/4403; G06F 11/3664; G06F 12/1433; G06F 21/606; G06F 21/74; G06F 21/79; G06F 13/4282; H04L 9/3226; H04L 2209/12; H04L 12/40; H04L 43/0817; H04L 9/0816; G01R 31/318597; G01R 31/31907; G01R 31/318533; G01R 31/31705
See application file for complete search history.

(56) References Cited

U.S. PATENT DOCUMENTS

| | | |
|---|---|---|
| 4,333,090 A | 6/1982 | Hirsch |
| 4,479,112 A | 10/1984 | Hirsch |

(Continued)

OTHER PUBLICATIONS

International Search Report and Written Opinion in International Application No. PCT/US2015/051346, dated Jan. 8, 2016, 9 pages.

*Primary Examiner* — Guerrier Merant
(74) *Attorney, Agent, or Firm* — Kowert Hood Munyon Rankin and Goetzel PC; Rory D. Rankin

(57) ABSTRACT

Systems, apparatuses, and methods for implementing debug features on a secure coprocessor to handle communication and computation between a debug tool and a debug target are disclosed. A debug tool generates a graphical user interface (GUI) to display debug information to a user for help in debugging a debug target such as a system on chip (SoC). A secure coprocessor is embedded on the debug target, and the secure coprocessor receives debug requests generated by the debug tool. The secure coprocessor performs various computation tasks and/or other operations to prevent multiple round-trip messages being sent back and forth between the debug tool and the debug target. The secure coprocessor is able to access system memory and determine a status of a processor being tested even when the processor becomes unresponsive.

20 Claims, 9 Drawing Sheets

(51) Int. Cl.
*G01R 31/3177* (2006.01)
*G06F 13/42* (2006.01)
*H04L 9/08* (2006.01)

(52) U.S. Cl.
CPC ........ *G06F 13/4282* (2013.01); *H04L 9/0816* (2013.01); *G06F 2213/0042* (2013.01)

(56) References Cited

U.S. PATENT DOCUMENTS

| | | | | |
|---|---|---|---|---|
| 6,505,309 | B1* | 1/2003 | Okabayashi | G06F 11/3648 711/138 |
| 6,622,184 | B1* | 9/2003 | Tabe | G06F 11/3664 710/108 |
| 6,691,251 | B2* | 2/2004 | Wong | G06F 11/261 703/27 |
| 6,757,829 | B1* | 6/2004 | Laczko, Sr. | G06F 21/71 348/E7.056 |
| 7,835,521 | B1 | 11/2010 | Pinheiro | |
| 8,020,215 | B2 | 9/2011 | Nam | |
| 8,340,290 | B2 | 12/2012 | Kang | |
| 9,471,799 | B2 | 10/2016 | Schiffman et al. | |
| 2003/0056154 | A1* | 3/2003 | Edwards | G06F 11/25 714/45 |
| 2003/0159053 | A1 | 8/2003 | Fauble et al. | |
| 2006/0143539 | A1* | 6/2006 | Chun | G06F 11/267 714/39 |
| 2006/0195907 | A1 | 8/2006 | Delfs | |
| 2009/0119221 | A1 | 5/2009 | Weston | |
| 2012/0117433 | A1* | 5/2012 | Feng | G01R 31/31719 714/724 |
| 2012/0144477 | A1* | 6/2012 | Katayama | G06F 21/31 726/19 |
| 2012/0272059 | A1 | 10/2012 | Shetty | |
| 2013/0007466 | A1 | 1/2013 | Saranghar | |
| 2013/0073849 | A1 | 3/2013 | Wang | |
| 2013/0145475 | A1 | 6/2013 | Ryu | |
| 2013/0212425 | A1* | 8/2013 | Blaine | G06F 11/3648 714/6.1 |
| 2013/0262930 | A1* | 10/2013 | Nakamura | G06F 11/3664 714/27 |
| 2013/0266141 | A1 | 10/2013 | Kim | |
| 2013/0282951 | A1* | 10/2013 | Kuo | G06F 21/575 711/102 |
| 2014/0181529 | A1 | 6/2014 | Joyce, III | |
| 2016/0330094 | A1* | 11/2016 | Kniplitsch | H04L 9/3226 |

* cited by examiner

SECURE COPROCESSOR ASSISTED HARDWARE DEBUGGING

BACKGROUND

Description of the Related Art

Traditionally, a hardware debugging system has a hardware debugging tool running on a host personal computer (PC) communicating with a target system on chip (SoC) platform through a joint test action group (JTAG) connection via a JTAG emulator. The traditional hardware debugging system suffers from several shortcomings. For example, numerous debug features depend on a live central processing unit (CPU). Debug features are unable to provide reliable hardware debugging ability when CPU cores cannot respond to a debug request, with CPU cores unable to respond due to hanging, a clock stopping, or another issue. Also, there is an expensive performance penalty due to extensive round-trip data traffic between the debug software host and SoC target. Additionally, there is a debug ability limitation due to the typical JTAG design. Still further, there is a high cost associated with extending new debug features in SoC Design For Test and Design For Debug (DFx) designs.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for performing debug operations via a secure coprocessor are disclosed herein. In one implementation, a system includes a computer coupled to a debug target. In one implementation, the computer is coupled to the debug target via a network and a joint action test group (JTAG) emulator. The computer executes a debug tool software application which generates debug requests to send to the debug target. In one implementation, a secure coprocessor embedded within the debug target receives the debug requests and performs one or more operations in response to receiving each debug request. In one implementation, the secure coprocessor works as a back-end server in parallel with the main central processing unit (CPU) cores on the debug target. In this implementation, the secure coprocessor is responsible for providing critical services and performing computationally intensive tasks that would normally be performed by the debug tool. In one implementation, the secure coprocessor receives a virtual address and page map registers from the debug tool and then the secure coprocessor performs a page table walk to translate the virtual address to a physical address. The secure coprocessor implements the page table walk without incurring multiple round-trip communication delays communicating with the debug tool.

After performing the one or more operations in response to receiving the debug request, the secure coprocessor sends data back to the debug target. The debug tool reformats the data and then displays the data on a graphical user interface (GUI) to a user to assist in debugging the target. In one implementation, the secure coprocessor retrieves data from the debug target while one or more processors on the debug target are unresponsive. While the debug tool in traditional approaches would be unable to access the data needed for debugging the target when the processor(s) are unresponsive, the secure coprocessor allows for this data to be retrieved. This helps to provide enhanced insight into the cause of the unresponsive processor(s).

Figure 1:
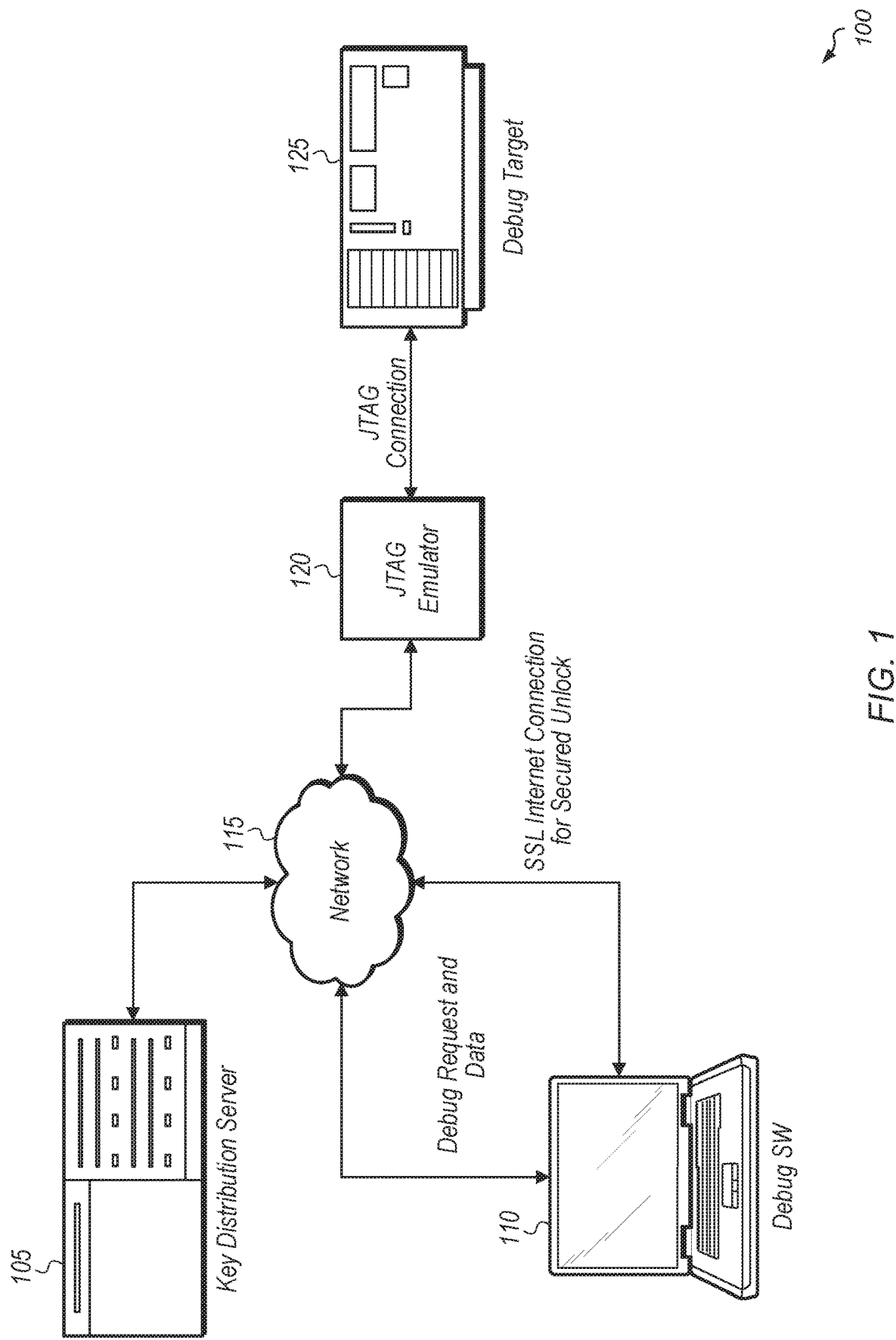
FIG. 1 is a block diagram of one implementation of a system for debugging a debug target.

Referring now to FIG. 1, a block diagram of one implementation of a system 100 for debugging a debug target 125 is shown. A computer 110 executes debug software (SW) (i.e., a debug tool) and communicates with joint test action group (JTAG) emulator 120. Computer 110 is representative of any type of computing device (e.g., desktop computer, laptop computer, server, mobile device). In various implementations, computer 110 includes one or more processors, one or more memory devices, a display, one or more input/output (I/O) interfaces, and the like. The one or more memory devices store program instructions which are executable by the one or more processors to implement one or more software debug applications.

In one implementation, computer 110 retrieves a key from key distribution server 105 to establish a secure connection between computer 110 and JTAG emulator 120 over network 115. Network 115 is representative of any type of network or combination of networks, including wireless connection, direct local area network (LAN), metropolitan area network (MAN), wide area network (WAN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. In various implementations, network 115 includes remote direct memory access (RDMA) hardware and/or software, transmission control protocol/internet protocol (TCP/IP) hardware and/or software, router, repeaters, switches, grids, and/or other components.

In one implementation, to initiate a debug session, the debug software executing on computer 110 queries the target information of debug target 125. The debug software delivers the target information to key distribution server 105 requesting an unlock debug feature. In response, key distribution server 105 delivers an unlock payload to a secure coprocessor on the debug target 125 via the debug software and JTAG emulator 120. When the secure coprocessor receives the unlock payload, the secure coprocessor unlocks a debug feature on the debug target 125. The debug software creates JTAG patterns and then sends the JTAG patterns to the JTAG emulator 120 over network 115. In response to receiving the JTAG patterns, the JTAG emulator 120 delivers corresponding JTAG commands to debug target 125. Debug target 125 outputs JTAG data shift outs which are conveyed through the JTAG emulator 120 to the debug software. The debug software then converts the JTAG data shift outs into debug data. In one implementation, the debug data is displayed to a user to help the user in resolving various issues during the debug process.

However, the above process suffers from several shortcomings. For example, numerous debug features depend on a live central processing unit (CPU) on the debug target 125. The debug features are unable to provide reliable hardware debugging ability when CPU cores cannot respond to the debug request due to the CPU cores hanging or having their clock stop. Also, the above process suffers a performance penalty due to the extensive round-trip data traffic between the debug software executing on host computer 110 and the debug target 125. Additionally, there is a high cost to extend new debug ability in a system on chip (SoC) design for test, design for debug (DFx) paradigm.

Figure 2:
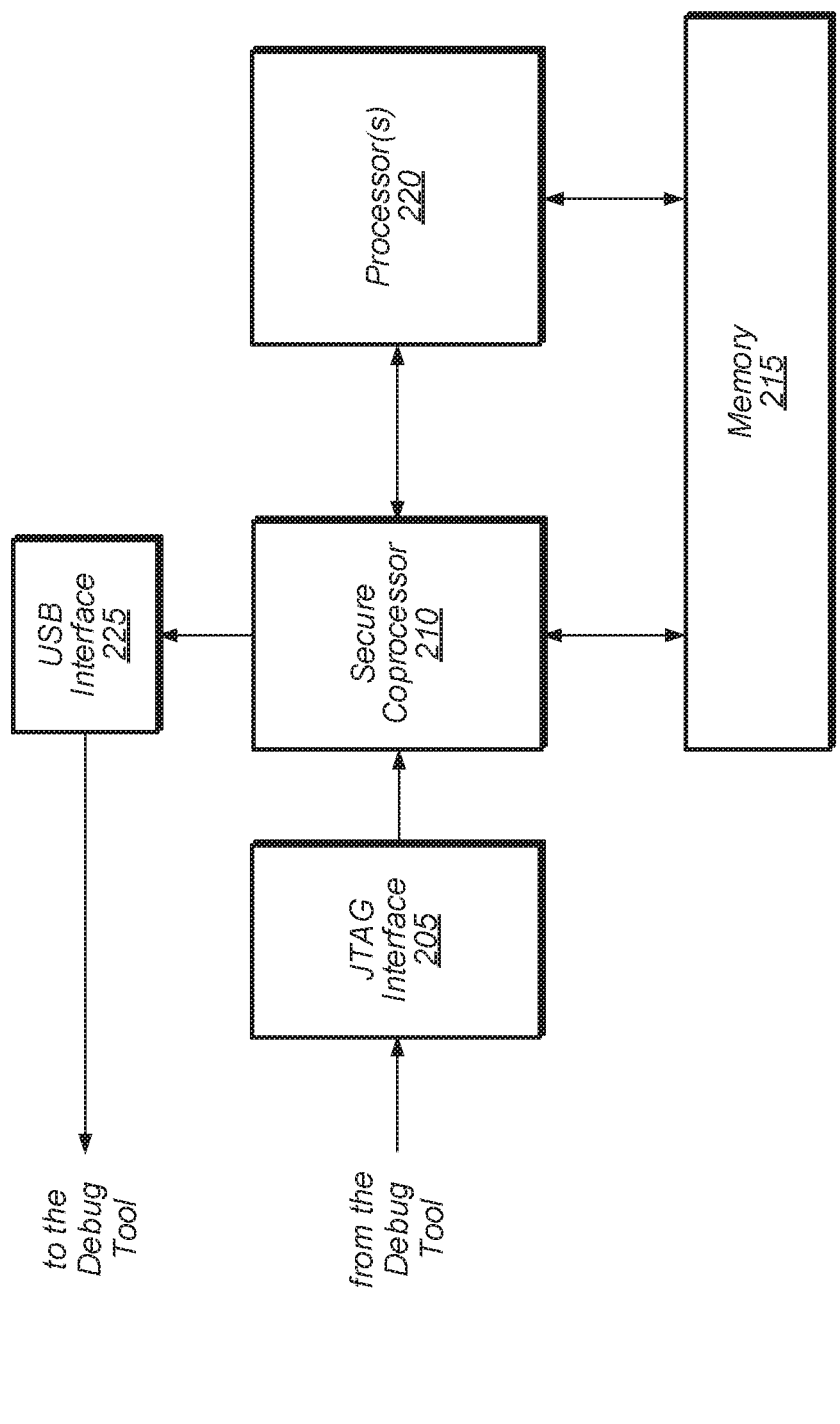
FIG. 2 is a block diagram of one implementation of a debug target.

Turning now to FIG. 2, a block diagram of one implementation of a debug target 200 is shown. In one implementation, debug target 200 includes a joint test action group (JTAG) interface 205, secure coprocessor 210, memory 215, processor(s) 220, and universal serial bus (USB) interface 225. It is noted that debug target 200 also includes any number of other components which are not shown to avoid obscuring the figure. Additionally, while secure coprocessor 210 is shown separate from processors 220, in other implementations the secure processor 210 may be included within one of the processor(s) 220. In one implementation, debug target 200 is a system on chip (SoC). In this implementation, the components of debug target 200 are integrated together into a single integrated circuit (IC). In other implementations, debug target 200 is any of various other types of computing devices or computing systems.

In one implementation, secure coprocessor 210 manages the configuration and security of debug target 200. In one implementation, secure coprocessor 210 manages the boot-up process of debug target 200 to ensure that debug target 200 boots up with authenticated boot code. Secure coprocessor 210 also manages various other functions associated with the boot-up process of debug target 200. After the boot-up process and after performing any number of other functions, secure coprocessor 210 releases processor(s) 220 to execute the boot code and to launch the operating system of debug target 200. In various implementations, secure coprocessor 210 is preloaded with any number of public/private keys. As used herein, the term "secure coprocessor" is defined as a component that executes instructions for performing authentication and validation functions which provide security protection for debug target 200. A main processor of processor(s) 220 is differentiated from secure coprocessor 210, with the main processor executing operating system instructions and user application instructions. An additional differentiating factor between a main processor and secure coprocessor 210 is that secure coprocessor 210 includes one or more security-related mechanisms (e.g., random number generator, cryptographic coprocessor). Also, secure coprocessor 210 stores one or more unique encryption/decryption keys inaccessible to the rest of debug target 200. Accordingly, secure coprocessor 210 provides a hardware-based root of trust for debug target 200, allowing debug target 200 to start up in a secure environment. It is noted that secure coprocessor 210 can also be referred to as a "security processor" herein.

Memory 215 is representative of any number and type of memory devices. In one implementation, memory 215 serves as the system memory for processor(s) 220. Processor(s) 220 are representative of any number of processing units that are included within debug target 200. For example, in one implementation, processor(s) 220 include a plurality of processor cores within a central processing unit (CPU). In one implementation, software is executed on processor(s) 220 as part of a debug test operation. A debug tool (not shown) sends debug commands via the JTAG interface 205 to secure coprocessor 210. Secure coprocessor 210 performs operations in response to receiving the debug commands and then sends commands and/or data to processor(s) 220 as a result of these operations. In some cases, secure coprocessor 210 writes instructions and/or data to memory 215, and processor(s) 220 retrieve the instructions from memory 215 for execution.

In one implementation, secure coprocessor 210 retrieves data (generated by processor(s) 220 during one or more debug tests) from memory 215 and sends the data over USB interface 225 to the debug tool. USB interface 225 is representative of any type of interface that is used for sending data back to the debug tool. In one implementation, processor(s) 220 become deadlocked (i.e., unresponsive) during a debug test. When this happens, processor(s) 220 are unable to respond to commands sent by the debug tool. In a traditional approach to debugging, this occurrence would prevent the debug tool from retrieving data from processor(s) 220 or from memory 215. However, when the debug tool interfaces with secure coprocessor 210, secure coprocessor 210 is able to read data from memory 215 and return the data to the debug tool to assist in the debugging process.

In one implementation, the debug tool sends a request to retrieve data at a particular virtual address. In response to receiving the request, secure coprocessor 210 performs a multi-step page table walk to determine a physical address that corresponds to this particular virtual address. In the traditional debug approach, the debug tool would be responsible for performing the multi-step page-table walk, which would require multiple round-trip delays from the debug tool to debug target 200 and then back to the debug tool for each step of the page-table walk. In contrast, when secure coprocessor 210 performs the multi-step page-table walk locally on debug target 200, this eliminates a round-trip delay for each step of the page-table walk. Once secure coprocessor 210 has determined the physical address for a given virtual address, secure coprocessor 210 retrieves the data buffer from this physical address and returns the data to the debug tool via USB interface 225.

Figure 3:
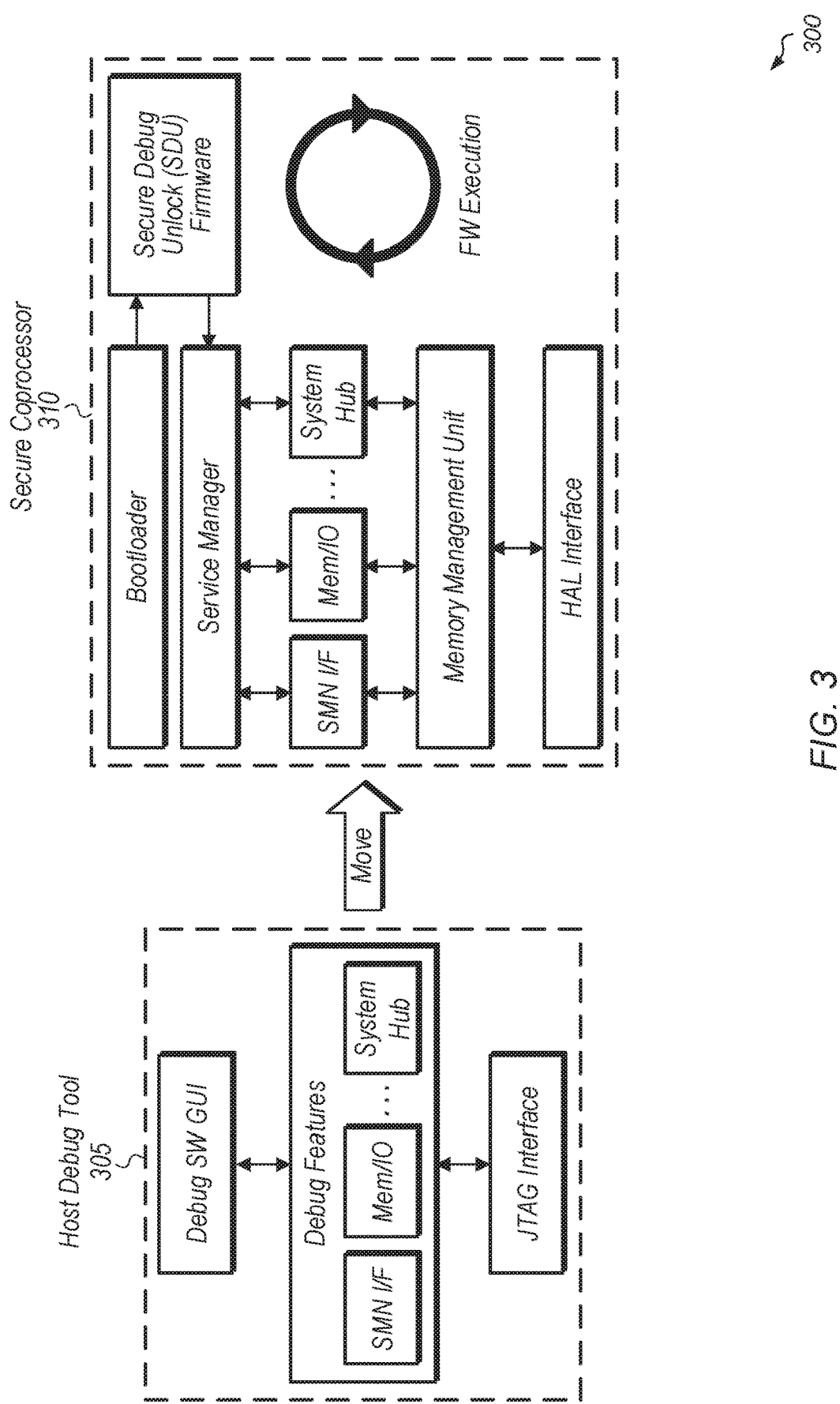
FIG. 3 is a block diagram of one implementation of the debug software features of a host debug tool and a secure coprocessor.

Referring now to FIG. 3, a block diagram of one implementation of the debug software features of a host debug tool 305 and a coprocessor 310 is shown. In one implementation, a traditional host debug tool includes a debug software graphical user interface (GUI) to display the results of debug operations to a user. The debug features of host debug tool 305 include a system management network (SMN) interface, a memory input/output (I/O) interface, a system hub, and one or more other features. Host debug tool 305 also includes a JTAG interface for interfacing with secure coprocessor 310 on the debug target.

In one implementation, the debug features of host debug tool 305 are moved to secure coprocessor 310 to make the overall debug process more efficient. In this implementation, secure coprocessor 310 includes a bootloader and a service manager interacting with secure debug unlock firmware. The secure coprocessor 310 also includes a system management network interface, memory and I/O interface, a system hub, and/or one or more other interfaces. Additionally, the secure coprocessor 310 includes a memory management unit and a hardware abstraction layer (HAL) interface. In one implementation, host debug tool 305 communicates with secure coprocessor 310 over a network via a JTAG emulator. The secure coprocessor 310 also communicates with the host debug tool 305 using a USB interface. In other implementations, host debug tool 305 and secure coprocessor 310 communicate using other types of interfaces.

Figure 4:
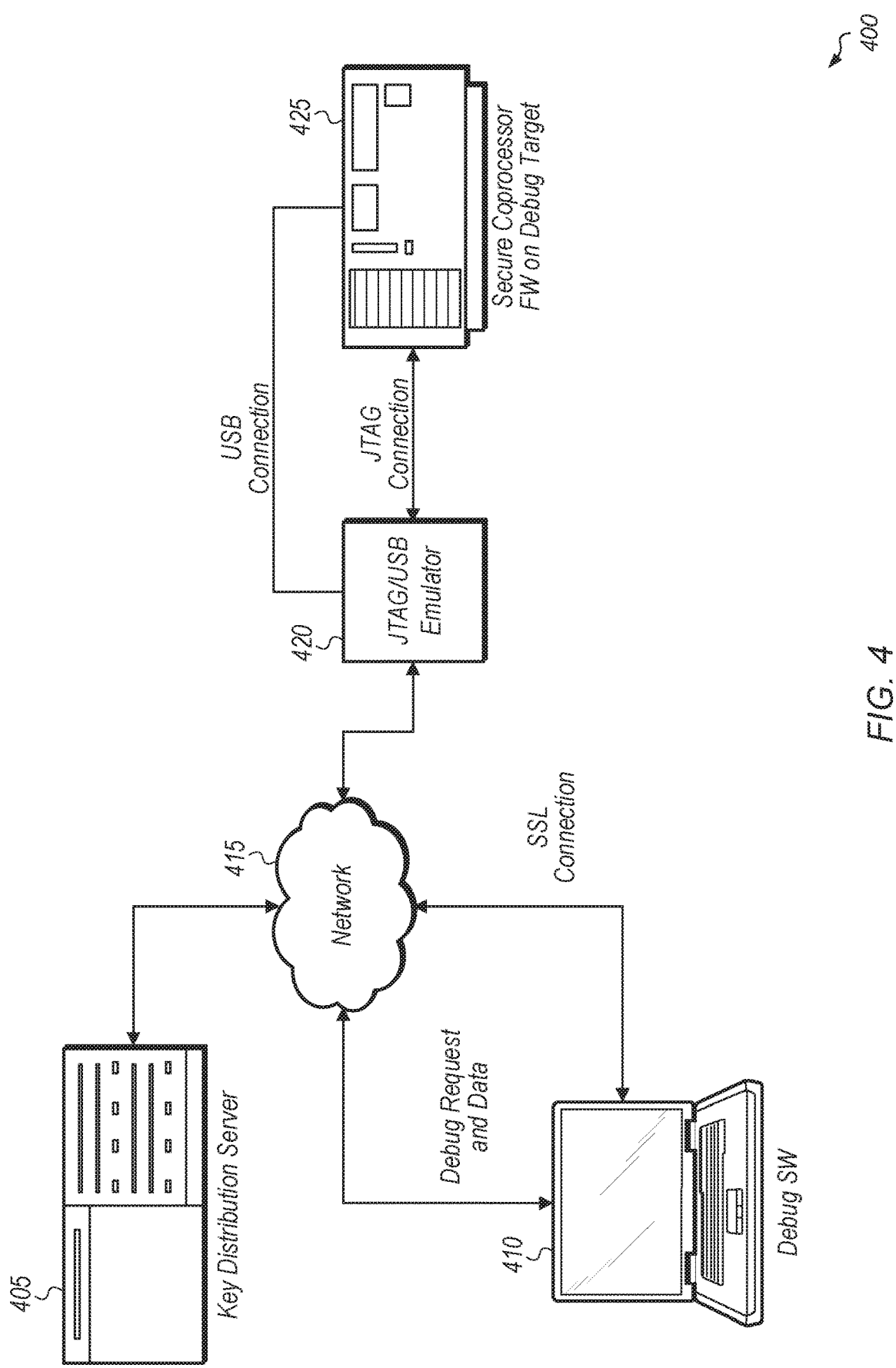
FIG. 4 is a block diagram of another implementation of a system for debugging a debug target.

Turning now to FIG. 4, a block diagram of another implementation of a computing system 400 for testing a debug target 425 is shown. In one implementation, system 400 includes a computer 410 executing debug software for controlling a debug target 425 via a network 415 and JTAG/USB emulator 420. In this implementation, system 400 also includes key distribution server 405 for providing keys for unlocking debugging sessions on debug target 425. In one implementation, computer 410 and JTAG/USB emulator 420 communicate over network 415 using a Secure Sockets Layer (SSL) connection. Compared with system 100, various debug functions are performed by a secure coprocessor on debug target 425 that were previously performed as part of the debug tool (on computer 410). These debug functions that are now performed by the secure coprocessor eliminate the need for multiple round-trip communication steps between debug target 425 and the debug tool executing on computer 410.

Figure 5:
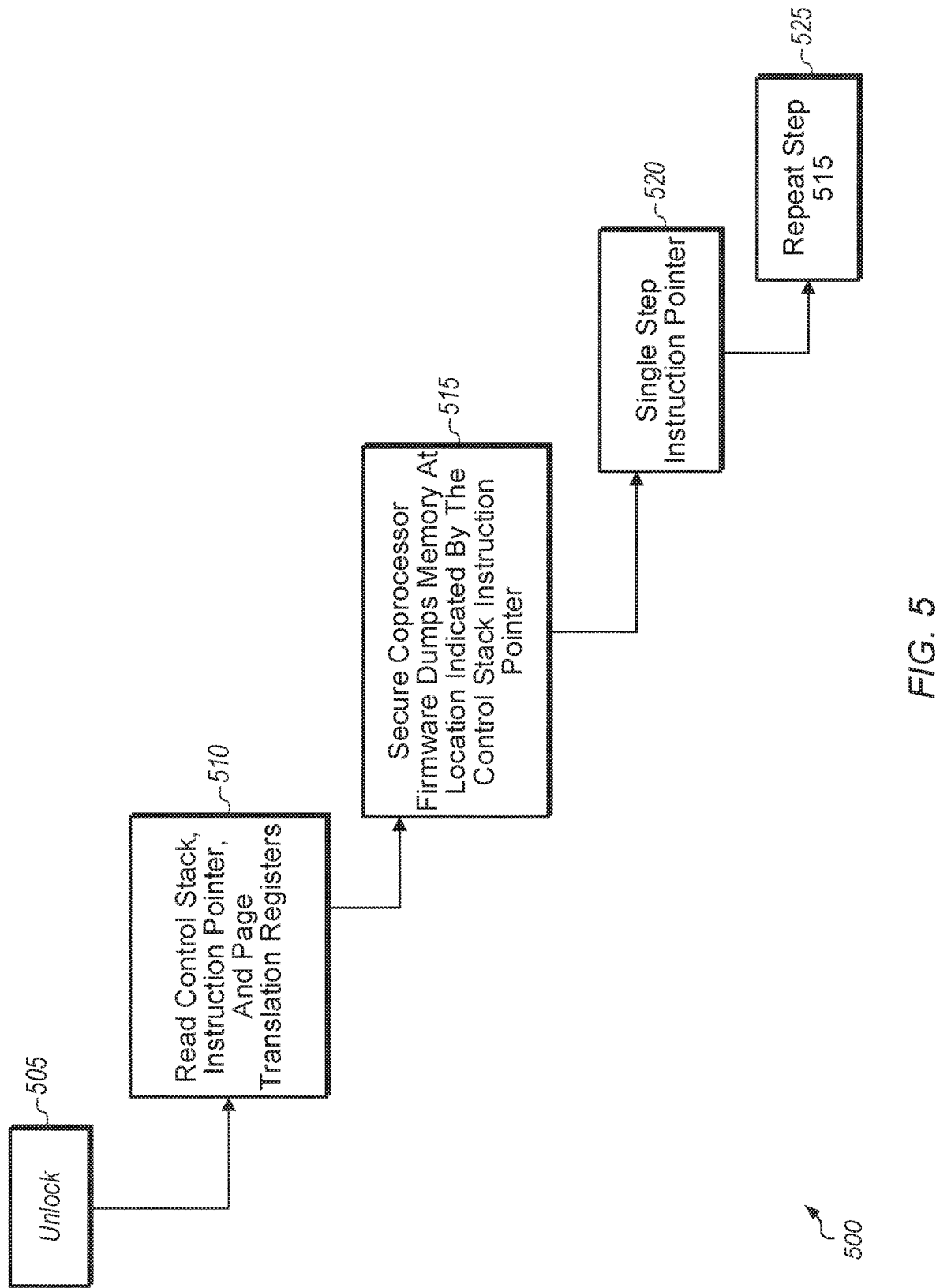
FIG. 5 is a block diagram of one implementation of a process for implementing debug operations.

Referring now to FIG. 5, a block diagram of one implementation of a process 500 for implementing debug operations is shown. In one implementation, process 500 starts in step 505 with a debug tool generating an unlock request for a debug target and the debug tool conveying the unlock request to a secure coprocessor. In response to receiving the unlock request, the debug tool reads the control stack, instruction pointer, and page translation registers, and passes them to the secure coprocessor in step 510. The secure coprocessor firmware dumps memory at a location indicated by the control stack instruction pointer in step 515. Then, debug tool increases the instruction pointer by a single step in step 520. Finally, step 525 involves repeating steps 510-515 if necessary. It is noted that in other implementations, process 500 includes other steps arranged in other suitable orders.

Figure 6:
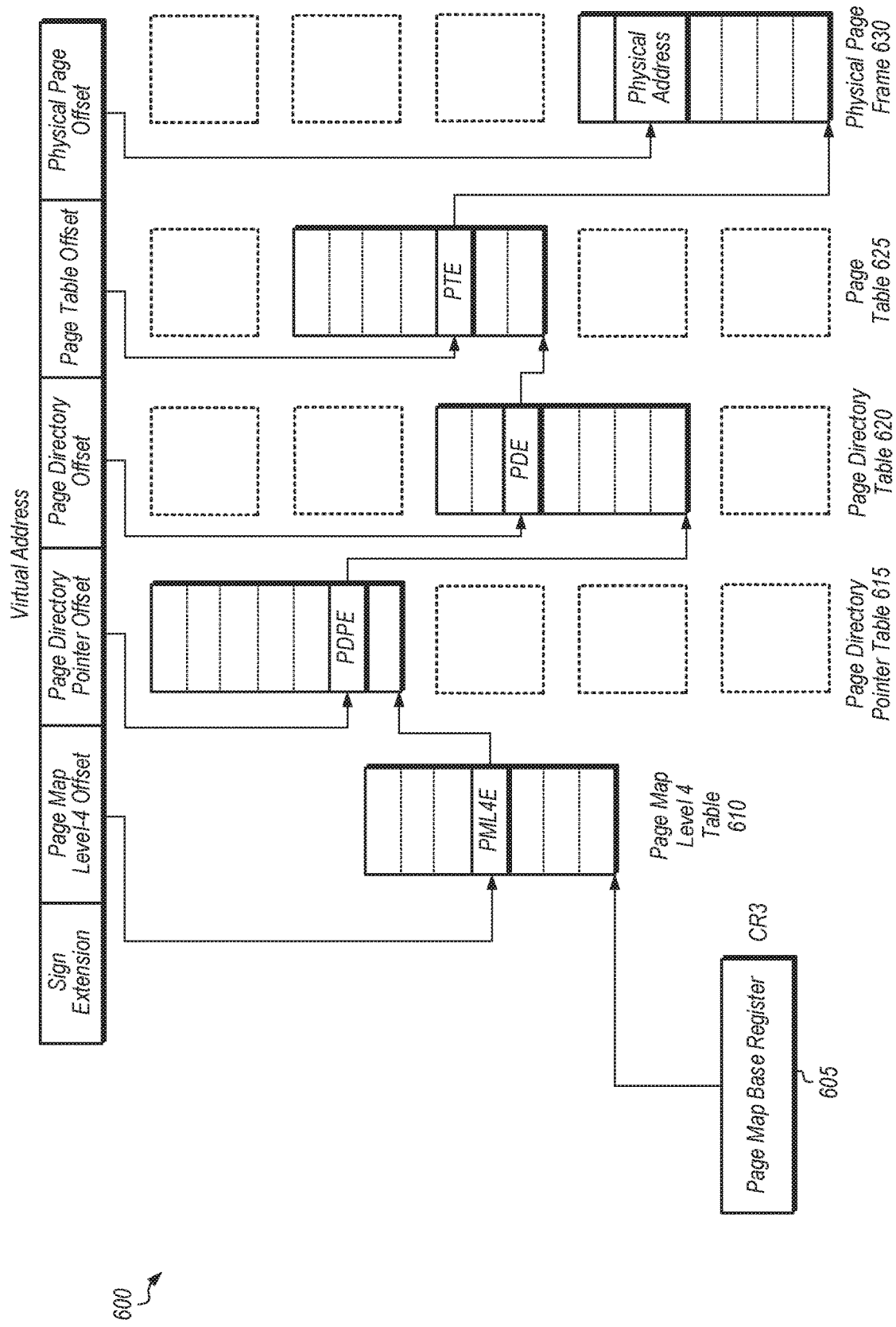
FIG. 6 is a block diagram of one implementation of a multi-step page table walk.

Turning now to FIG. 6, a block diagram of one implementation of a multi-step page table walk 600 is shown. An example virtual address is shown at the top of FIG. 6. It should be understood that the virtual address can have any number of bits (e.g., 64) with the number of bits varying according to the implementation. In one implementation, a page map level-4 offset is used to select an entry from a particular page map level 4 table 610 pointed to by page map base register 605. The entry from page map level 4 table 610 points to a particular page directory pointer table 615, with the page directory pointer offset selecting an entry from this particular page directory pointer table 615. Next, the entry in table 615 points to a particular page directory table 620, with the page directory offset selecting an entry from this particular page directory table 620. The entry from table 620 points to a particular page table 625, with the page table offset used to select an entry from this particular page table 625. The physical page offset from the virtual address selects the physical address from the particular physical page frame 630 pointed to by the entry in page table 625.

It is noted that each step of the multi-step page table walk 600 results in a round-trip delay for communication to be sent back to the debug tool in the traditional approach to debugging a target SoC. However, when using a secure coprocessor as described herein, the secure coprocessor receives a virtual address from the debug tool, and then the secure coprocessor performs the entire multi-step page table walk 600 without incurring the round-trip communication delay back to the debug tool for each step. This allows each multi-step page table walk 600 to be performed much more quickly for each virtual address that needs to be translated to a physical address during debug operations.

Figure 7:
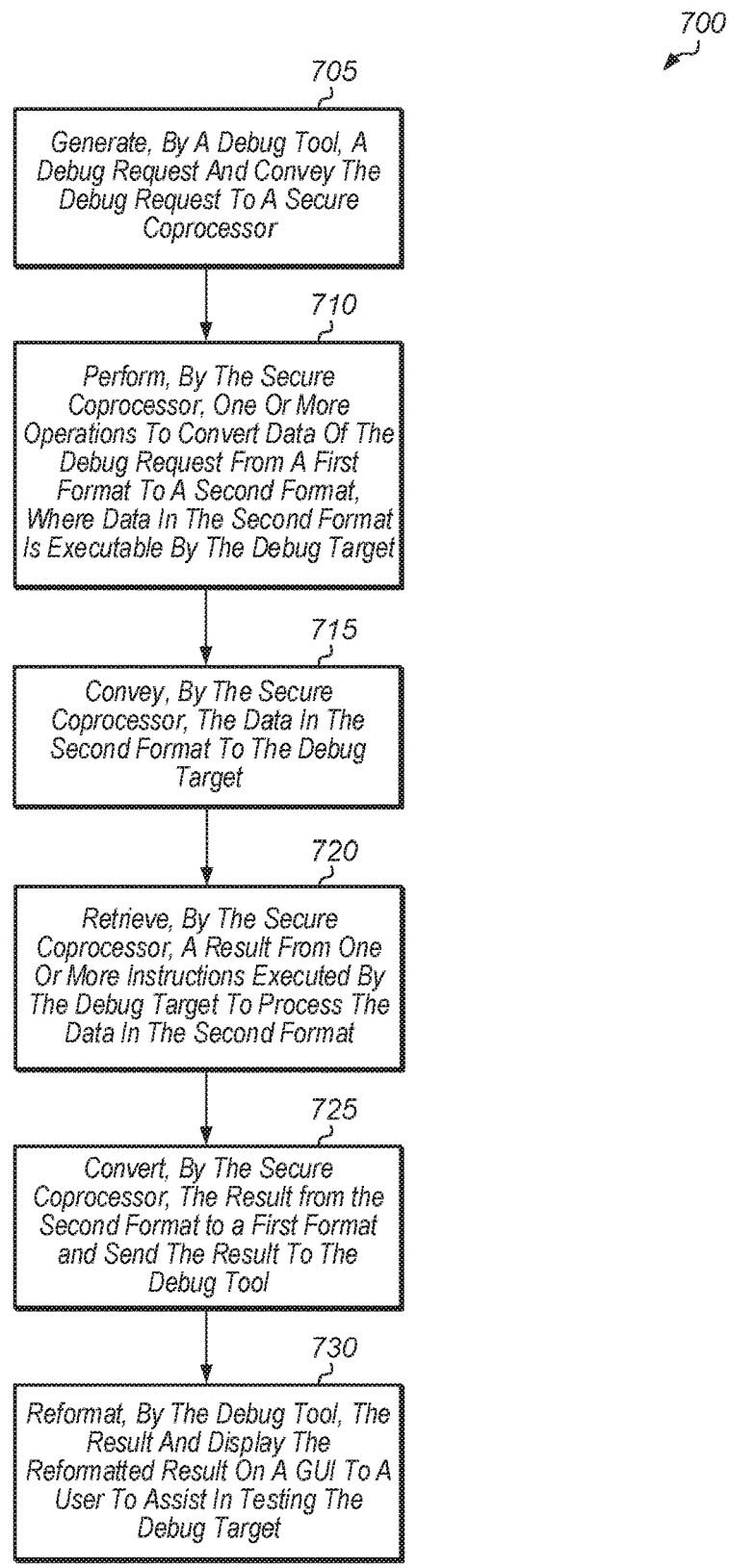
FIG. 7 is a generalized flow diagram illustrating one implementation of a method for implementing a debug operation using a secure coprocessor.
Figure 8:
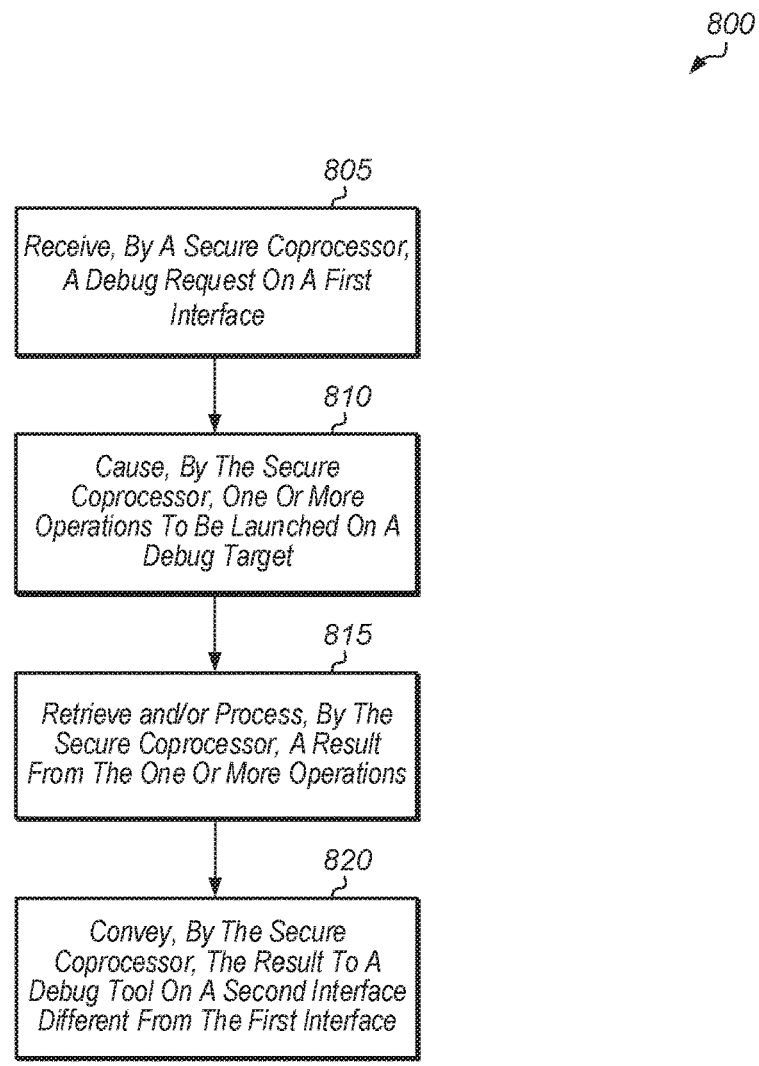
FIG. 8 is a generalized flow diagram illustrating one implementation of a method for employing multiple interfaces during a debug operation.
Figure 9:
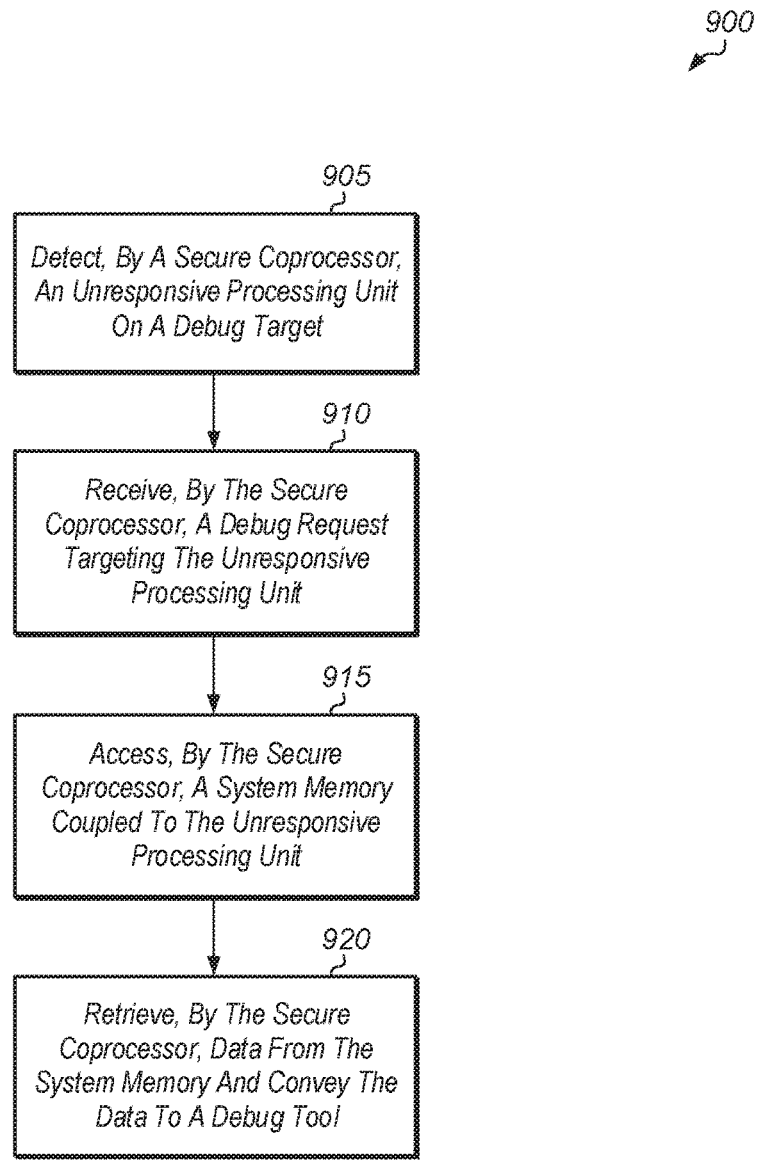
FIG. 9 is a generalized flow diagram illustrating one implementation of a method for performing a debug operation for an unresponsive processing unit.

Referring now to FIG. 7, one implementation of a method 700 for implementing a debug operation using a secure coprocessor is shown. For purposes of discussion, the steps in this implementation and those of FIG. 8-9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 700.

A debug tool generates a debug request and conveys the debug request to a secure coprocessor (block 705). As used herein, a "debug request" is defined as a request for data stored at a particular address in memory, a request for a debug target to execute one or more instructions, a request for the debug target to execute a particular program, a request for the secure coprocessor and/or debug target to perform one or more computations, or a request for the secure coprocessor and/or debug target to perform one or more other actions. As used herein, a "debug target" is defined as a computing system or computing device undergoing one or more tests to determine if the system or device meets one or more functional requirements. For example, in one implementation, the debug target is a SoC, with the SoC including a plurality of processor cores. In other implementations, the debug target is any of various other types of computing devices or systems.

In response to receiving the debug request, the secure coprocessor performs one or more operations to convert data of the debug request from a first format to a second format, where data in the second format is executable by, or otherwise compatible with, by the debug target (block 710). For ease of discussion, the term "executable" will generally be used herein to mean executable by, or otherwise compatible with. In one implementation, the one or more operations are a page table lookup, with a virtual address being the data in a first format and a physical address being the data in a second format. In another implementation, the one or more operations are various types of complex calculations to translate and/or convert the debug request into commands that are compatible with and understood by the debug target. Next, the secure coprocessor conveys the data in the second format to the debug target (block 715). Then, the secure coprocessor retrieves a result from one or more instructions executed by the debug target to process the data in the second format (block 720). In one implementation, the one or more instructions are the initiation of a memory dump to a memory of the debug target. Next, the secure coprocessor converts the result from the second format to the first format and sends the result to the debug tool (block 725). Then, the debug tool reformats the result and displays the reformatted result on a GUI to a user to assist in testing the debug target (block 730). After block 730, method 700 ends.

Turning now to FIG. 8, one implementation of a method 800 for employing multiple interfaces during a debug operation is shown. A secure coprocessor receives a debug request on a first interface (block 805). In one implementation, the first interface is a JTAG interface. Next, in response to receiving the debug request on the first interface, the secure coprocessor causes one or more operations to be launched on a debug target (block 810). Then, the secure coprocessor retrieves and/or processes a result from the one or more operations (block 815). In one implementation, the result is retrieved from a memory coupled to the debug target. Next, the secure coprocessor conveys the result to a debug tool on a second interface different from the first interface (block 820). In one implementation, the second interface is a USB interface. After block 820, method 800 ends.

Referring now to FIG. 9, one implementation of a method 900 for performing a debug operation for an unresponsive processing unit is shown. A secure coprocessor detects an unresponsive processing unit on a debug target (block 905). In one implementation, the unresponsive processing unit is a processor core of a CPU. Also, the secure coprocessor receives a debug request targeting the unresponsive processing unit (block 910). In some cases, the secure coprocessor detects the unresponsive processing unit prior to receiving the debug request while in other cases, the secure coprocessor detects the unresponsive processing unit after receiving the debug request.

In response to receiving the debug request targeting the unresponsive processing unit, the secure coprocessor accesses a system memory coupled to the unresponsive processing unit (block 915). Next, the secure coprocessor retrieves data from the system memory and conveys the data to a debug tool (block 920). After block 920, method 900 ends. It is noted that in traditional approaches, the debug tool is unable to retrieve data from the system memory when the processing unit hangs, the clock stops, or another event causes the processing unit to freeze. In traditional approaches, this prevents the debug tool from ascertaining the reason for the unresponsive processing unit. However, by utilizing the secure coprocessor to retrieve data from the system memory, the debug tool has better visibility into determining the cause of the unresponsive processing unit.

In various implementations, program instructions of a software application are used to implement the methods and/or mechanisms described herein. For example, program instructions executable by a general or special purpose processor are contemplated. In various implementations, such program instructions can be represented by a high level programming language. In other implementations, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a debug tool;
a debug target comprising at least one processor; and
a secure coprocessor configured to provide security protection for the system by performing authentication and validation functions;
wherein the system is configured to:
generate, by the debug tool, a debug request and convey the debug request to the secure coprocessor;
perform, by the secure coprocessor, one or more operations to convert data of the debug request from a first format to a second format in response to receiving the debug request, wherein data in the second format is executable by the debug target;
convey, by the secure coprocessor, the data in the second format to the debug target;
perform, by the secure coprocessor, one or more operations to convert a result from the second format to the first format, wherein the result is generated by the debug target executing one or more instructions on the data in the second format; and
convey, by the secure coprocessor, the result to the debug tool to be displayed to a user to assist in debug operations associated with the debug target.

2. The system as recited in claim 1, wherein:
the result comprises data from a memory coupled to the debug target; and
the debug request comprises a virtual address corresponding to a physical address of a location from which to retrieve the data.

3. The system as recited in claim 2, wherein the secure coprocessor is configured to decrypt the data with an encryption key prior to conveying the data to the debug tool.

4. The system as recited in claim 2, wherein:
the debug request is conveyed to the secure coprocessor on a first interface;
the data is conveyed to the debug tool on a second interface; and
the second interface is a universal serial bus (USB) link.

5. The system as recited in claim 1, wherein:
the secure coprocessor is integrated within the debug target;
the secure coprocessor is configured to boot up the debug target in a root of trust; and
the debug target is a system on chip (SoC).

6. The system as recited in claim 1, wherein the one or more operations are page table walk operations.

7. The system as recited in claim 1, wherein the one or more operations are performed by the secure coprocessor without involving round-trip communication with the debug tool.

8. A method comprising:
providing, by a secure coprocessor, security protection by performing authentication and validation functions;
generating, by a debug tool, a debug request and conveying the debug request to the secure coprocessor;
performing, by the secure coprocessor, one or more operations to convert data of the debug request from a first format to a second format in response to receiving the debug request, wherein data in the second format is executable by a debug target;
conveying, by the second coprocessor, the data in the second format to the debug target;
performing, by the secure coprocessor, one or more operations to convert a result from the second format to the first format, wherein the result is generated by the debug target executing one or more instructions on the data in the second format; and
conveying, by the secure coprocessor, the result to the debug tool to be displayed to a user to assist in debug operations associated with the debug target.

9. The method as recited in claim 8, wherein:
the result comprises data from a memory coupled to the debug target; and
the debug request comprises a virtual address corresponding to a physical address of a location from which to retrieve the data.

10. The method as recited in claim 9, further comprising decrypting, by the secure coprocessor, the data with an encryption key prior to conveying the data to the debug tool.

11. The method as recited in claim 9, wherein:
the debug request is conveyed to the secure coprocessor on a first interface;
the data is conveyed to the debug tool on a second interface; and
the second interface is a universal serial bus (USB) link.

12. The method as recited in claim 8, wherein:
the secure coprocessor is integrated within the debug target;
the secure coprocessor is configured to boot up the debug target in a root of trust; and
the debug target is a system on chip (SoC).

13. The method as recited in claim 8, wherein the one or more operations are page table walk operations.

14. The method as recited in claim 8, wherein the one or more operations are performed by the secure coprocessor without involving round-trip communication with the debug tool.

15. An apparatus comprising:
a memory;
a debug target comprising at least one processor; and
a secure coprocessor configured to provide security protection for the apparatus by performing authentication and validation functions;
wherein the secure coprocessor is configured to:
receive a debug request generated by a debug tool;
perform one or more operations to convert data of the debug request from a first format to a second format in response to receiving the debug request, wherein data in the second format is executable by the debug target;
convey the data in the second format to the debug target;
perform one or more operations to convert a result from the second format to the first format, wherein the result is generated by the debug target executing one or more instructions on the data in the second format; and
convey the result to the debug tool to be displayed to a user to assist in debug operations associated with the debug target.

16. The apparatus as recited in claim 15, wherein:
the result comprises data from the memory coupled to the debug target; and
the debug request comprises a virtual address corresponding to a physical address of a location from which to retrieve the data.

17. The apparatus as recited in claim 16, wherein the secure coprocessor is configured to decrypt the data with an encryption key prior to conveying the data to the debug tool.

18. The apparatus as recited in claim 16, wherein:
the debug request is conveyed to the secure coprocessor on a first interface;
the data is conveyed to the debug tool on a second interface; and
the second interface is a universal serial bus (USB) link.

19. The apparatus as recited in claim 15, wherein:
the secure coprocessor is integrated within the debug target;
the secure coprocessor is configured to boot up the debug target in a root of trust; and
the debug target is a system on chip (SoC).

20. The apparatus as recited in claim 15, wherein the one or more operations are page table walk operations.

* * * * *